US008699237B2

(12) United States Patent
Pan et al.

(10) Patent No.: US 8,699,237 B2
(45) Date of Patent: Apr. 15, 2014

(54) SOFT-SWITCHING INVERTER UTILIZING HIGH STEP UP RATIO CIRCUIT WITH ACTIVE CLAMPING

(75) Inventors: Ching-Tsai Pan, Hsinchu (TW);
Ming-Chieh Cheng, Hsinchu (TW);
Yu-Chuan Wang, Hsinchu (TW);
En-Lin Chen, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 205 days.

(21) Appl. No.: 13/483,102

(22) Filed: May 30, 2012

(65) Prior Publication Data

US 2013/0322126 A1 Dec. 5, 2013

(51) Int. Cl.
*H02M 3/335* (2006.01)
*H02M 3/24* (2006.01)

(52) U.S. Cl.
USPC ............... 363/17; 363/24; 363/25; 363/26; 363/95; 363/98; 363/131; 363/132; 363/133; 363/134

(58) Field of Classification Search
USPC ............ 363/17, 24, 25, 26, 95, 98, 131, 132, 363/133, 134
See application file for complete search history.

(56) References Cited

U.S. PATENT DOCUMENTS

| 5,038,267 | A | * | 8/1991 | De Doncker et al. | ............ 363/89 |
| 5,198,969 | A | * | 3/1993 | Redl et al. | ............ 363/17 |
| 5,781,419 | A | * | 7/1998 | Kutkut et al. | ............ 363/17 |
| 5,946,200 | A | * | 8/1999 | Kim et al. | ............ 363/17 |
| 6,038,142 | A | * | 3/2000 | Fraidlin et al. | ............ 363/17 |
| 6,937,483 | B2 | * | 8/2005 | Zhu et al. | ............ 363/17 |
| 2003/0198064 | A1 | * | 10/2003 | Zhu et al. | ............ 363/21.01 |

* cited by examiner

*Primary Examiner* — Bao Q Vu
(74) *Attorney, Agent, or Firm* — Jackson IPG PLLC

(57) ABSTRACT

An inverter with soft switching is used for a high step-up ratio and a high conversion efficiency. The inverter includes an isolation voltage-quadrupling DC converter and an AC selecting switch. The isolation voltage-quadrupling DC converter includes an active clamping circuit. By a front-stage converter circuit, a continuous half-sine-wave current is generated. By a rear-stage AC selecting switch, the half-sine-wave current is turned into a sine-wave current. Thus, electricity may be supplied to an AC load or the grid. The circuit is protected by isolating the low-voltage side from the high-voltage side. The conversion efficiency is high. The leakage inductance is low. The switch stress is low. The inverter is durable and reliable. Hence, the inverter is suitable for use in a photovoltaic system to increase the total conversion efficiency.

5 Claims, 14 Drawing Sheets

SOFT-SWITCHING INVERTER UTILIZING HIGH STEP UP RATIO CIRCUIT WITH ACTIVE CLAMPING

BACKGROUND OF INVENTION

1. Field of Invention

The present invention relates to a soft-switching inverter and, more particularly, to a low-power, high-efficiency, high-step-up-ratio inverter for providing electricity to an AC load or the grid.

2. Related Prior Art

To prevent the global weather and ecosystem from getting worse due to the use of fossil fuel, lots of efforts have been made on developing solar cells, fuel cells and wind turbines. It is difficult to build large power plants based on renewable energy in densely populated regions such as Taiwan. Instead, small decentralized power plants based on renewable energy are popular in the densely populated regions.

The small decentralized power plants may be classified into three categories. At first, there are stand-alone systems. A stand-alone system provides electricity based on decentralized renewable energy such as the sun light and wind. The stand-alone system provides electricity to a load and/or a battery. The stand-alone system recharges the battery when it provides more electricity than the load consumes. The battery provides electricity to the load when the stand-alone system provides less electricity than the load consumes.

Secondly, there are grid-connection systems. A grid-connection system provides electricity to a load and/or the grid. The grid-connection system provides electricity to the grid when it provides more electricity than the load consumes. The grid provides electricity to the load when the grid-connection system produces less electricity than the load consumes.

Thirdly, there are hybrid systems each as a combination of a stand-alone system with a grid-connection system. A hybrid system operates like a grid-connection system when the grid operates normally. The hybrid system operates like a stand-alone system when the grid fails.

There have been few stories of building conventional grid-connection systems on low-capacity photovoltaic modules. The present invention is intended to obviate or at least alleviate the problems encountered in prior art.

SUMMARY OF INVENTION

It is the primary objective of the present invention to provide a low-power, high-efficiency, high-step-up-ratio, soft-switching inverter for providing electricity to an AC load or the grid.

To achieve the foregoing objective, the soft-switching inverter includes an isolation voltage-quadrupling DC converter and an AC selecting switch unit electrically connected to the isolation voltage-quadrupling DC converter and the grid. The isolation voltage-quadrupling DC converter includes an isolation transformer. The isolation transformer includes a first inductor, a second inductor, a first main switch, a second main switch and an active clamping circuit on a low-voltage side. The active clamping circuit includes a first clamping switch, a second clamping switch and a clamping capacitor. The isolation transformer includes a first diode, a second diode, a third diode, a fourth diode and a booster on a high-voltage side. The booster includes a first capacitor, a second capacitor, a third capacitor and a fourth capacitor. The isolation voltage-quadrupling DC converter receives a DC power supply, converts the voltage of the DC power supply, and executes half-sine modulation on the DC power supply for operation in a continuous conduction mode, thus a continuous half-sine current. The AC selecting switch unit includes a first power switch, a second power switch, a third power switch and a fourth power switch. The switches are switched in synchronization with the grid to convert the half-sine current to a sine current. A low-frequency portion is filtered from the sine current with a filtering inductor and a filtering capacitor to render the output current a sine current at the same voltage as the grid so that electricity can be fed to the load or a unit power factor can be fed to the grid.

In another aspect, the first main switch, the second clamping switch and the second main switch are switched in a complementary manner. The second main switch, the first clamping switch and the first main switch are switched in a complementary manner.

In another aspect, the difference between the phases of the first and second main switches is 180 degrees.

In another aspect, the first clamping switch and the first main switch are switched. The second clamping switch and the second main switch are switched to provide a dead time for soft switching.

In another aspect, the step-up ratio is $$\frac{V_o}{V_{IN}} = \frac{4n}{1-D},$$

wherein n stands for the turn ratio of the isolation transformer.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
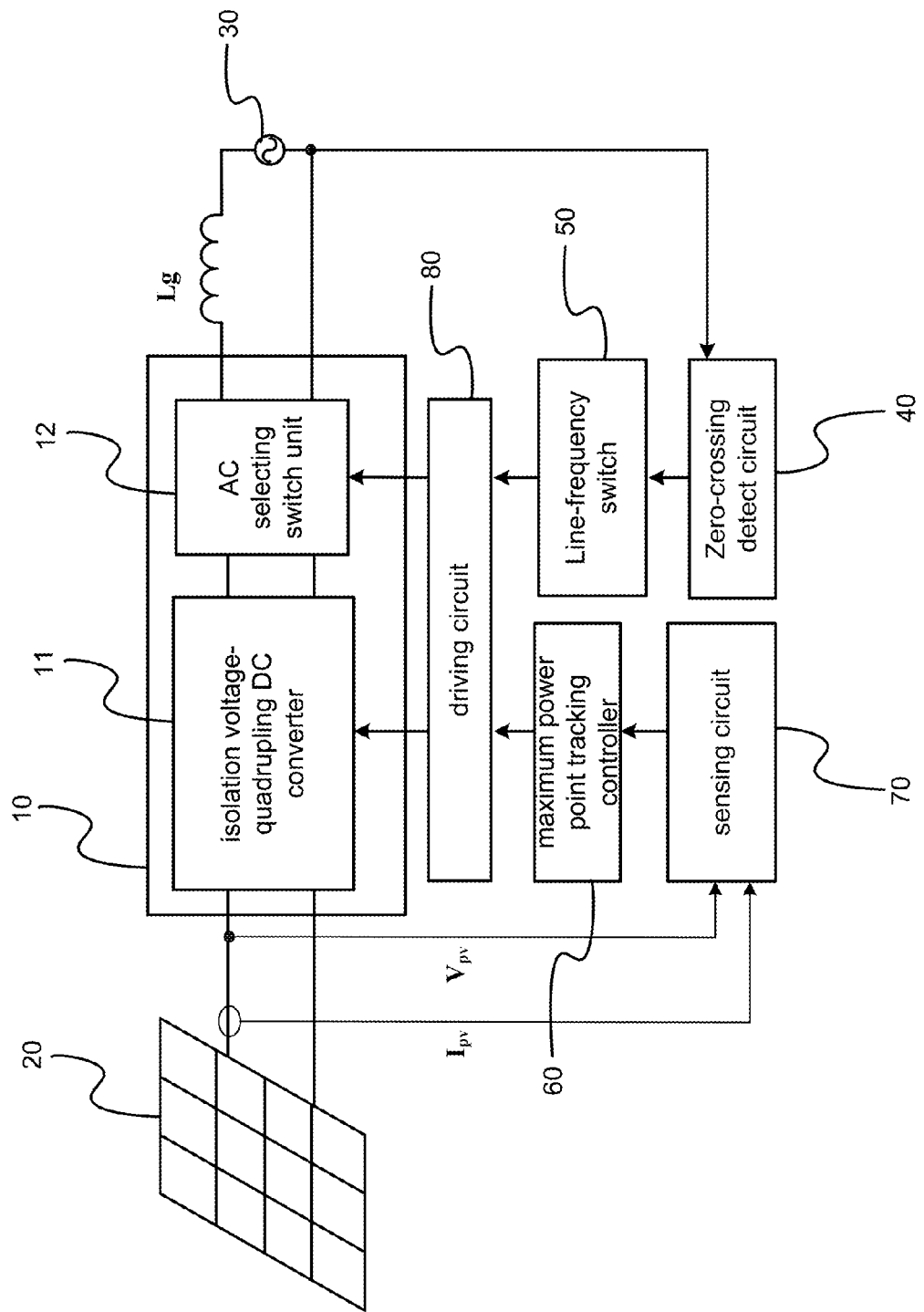
FIG. 1 is a block diagram of a soft-switching inverter according to the preferred embodiment of the present invention.

Referring to FIG. 1, there is shown a photovoltaic system including a soft-switching high-efficiency inverter 10 according to the preferred embodiment of the present invention. The photovoltaic system includes the inverter 10, a solar cell module 20 and a controlling stage for obtaining a maximum power of the solar cell module 20. The controlling stage includes a zero-crossing detect circuit 40, a line-frequency select switch 50, a maximum power point tracking controller 60, a sensing circuit 70 and a driving circuit 80.

At a rear end, the inverter 10 is connected to the grid 30 or the load. The solar cell module 20 provides a DC power supply to provide a DC output voltage $V_{pv}$ and a DC output current $I_{pv}$. The DC power supply is converted to an AC power supply that is provided to the grid 30. However, the inverter 10 is not limited to use in a photovoltaic system. The inverter 10 can be used to boost and convert any DC power supply to an AC power supply.

Figure 2:
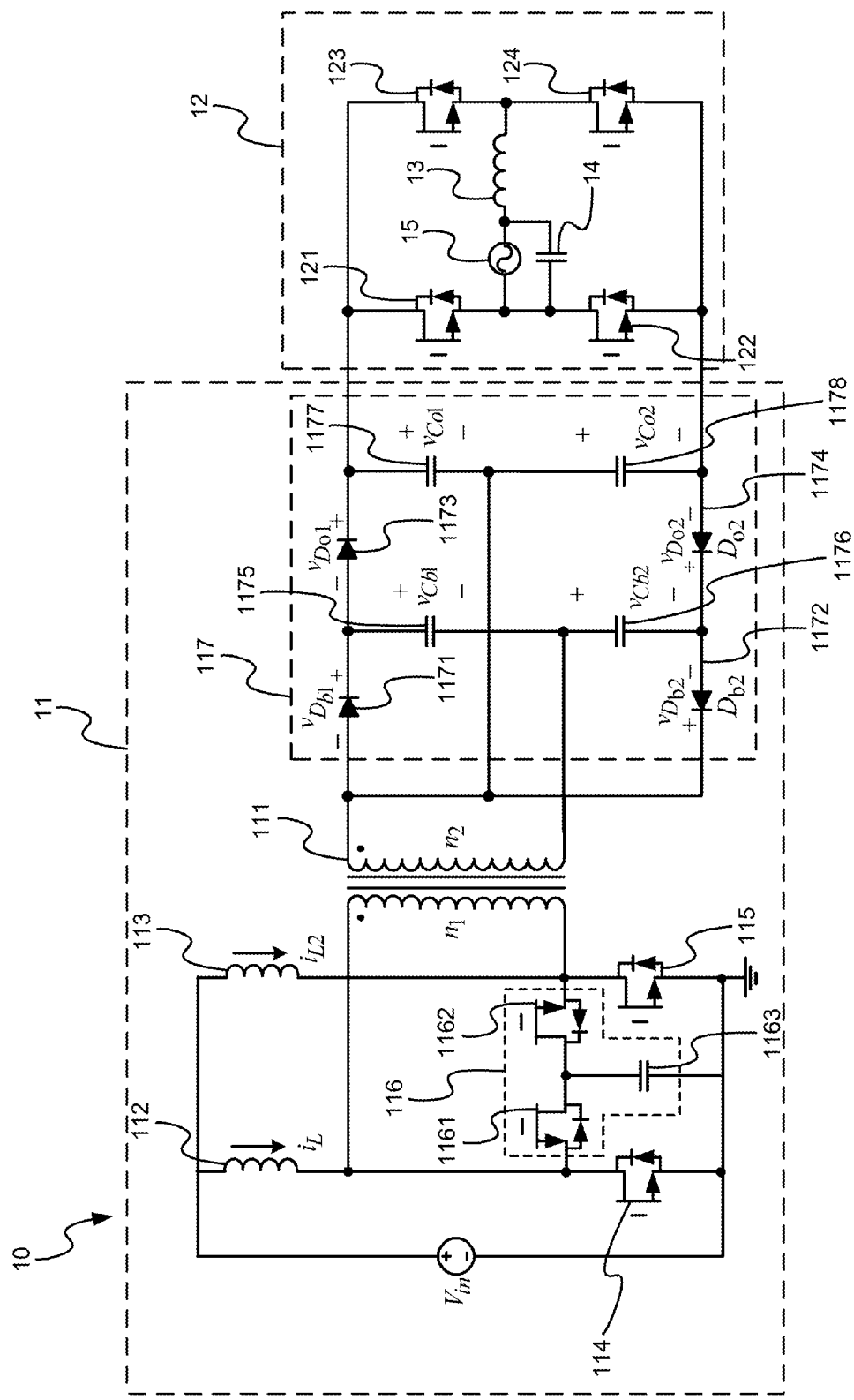
FIG. 2 is a circuit diagram of the soft-switching inverter shown in FIG. 1.

Referring to FIGS. 1 and 2, the soft-switching high-efficiency inverter 10 includes an isolation voltage-quadrupling DC converter 11 and an AC selecting switch unit 12. The isolation voltage-quadrupling DC converter 11 includes an isolation transformer 111.

On a low-voltage side, the isolation transformer 111 includes a first inductor ($L_1$) 112, a second inductor ($L_2$) 113, a first main switch ($S_1$) 114, a second main switch ($S_2$) 115 and an active clamping circuit 116. The active clamping circuit 116 includes a first clamping switch ($S_{c1}$) 1161, a second clamping switch ($S_{c2}$) 1162 and a clamping capacitor ($C_c$) 1163.

On a high-voltage side, the isolation transformer 111 includes a booster 117. The booster 117 includes a first diode ($D_{b1}$) 1171, a second diode ($D_{b2}$) 1172, a third diode ($D_{o1}$) 1173, a fourth diode ($D_{o2}$) 1174, a first capacitor ($C_{b1}$) 1175, a second capacitor ($C_{b2}$) 1176, a third capacitor ($C_{o1}$) 1177 and a fourth capacitor ($C_{O2}$) 1178.

Thus, the isolation voltage-quadrupling DC converter 11 receives DC from a DC power supply, converts the voltage of the DC, executes half-sine modulation on the DC, and causes the DC power supply to operate in a continuous conduction mode ("CCM") to provide a continuous half-sine current.

The AC selecting switch unit 12 is electrically connected to the isolation voltage-quadrupling DC converter 11 and the grid 30. The AC selecting switch unit 12 includes a first power switch (QA) 121, a second power switch (QA') 122, a third power switch (QB) 123 and a fourth power switch (QB') 124. By synchronous switching between the AC selecting switch unit 12 and the grid 30, the half-sine current is converted to a sine current. A low-frequency switch portion is filtered from the sine current by a filtering inductor 13 and a filtering capacitor 14. Thus, there is provided an output sine current at the same voltage as the grid 30. Thus, electricity may be provided to a load or the grid 30.

Referring to FIG. 1, the solar cell module 20 is the input to the system. The power of the solar cell module 20 is influenced by irradiance and temperature. The line-frequency switch 50 is electrically connected to the inverter 10 via the zero-crossing detect circuit 40. The line-frequency switch 50 receives an output voltage and current from the inverter 10 to produce driving signals for driving the power switches 121 to 124 of the AC selecting switch unit 12.

The sensing circuit 70 is electrically connected to the solar cell module 20. On sensing the DC output voltage $V_{pv}$ and the DC output current $I_{pv}$ from the solar cell module 20, the sensing circuit 70 executes controlling stage calculation and provides a pulse width modulation ("PWM") signal to modulate the operative voltage or current of the solar cell module 20 to track the maximum power point.

The maximum power point tracking controller 60 is electrically connected to the sensing circuit 70 to calculate a maximum power point tracking command.

The driving circuit 80 is electrically connected to the maximum power point tracking controller 60, the line-frequency switch 50 and the inverter 10. The driving circuit 80 receives a half-sine PWM signal from the maximum power point tracking controller 60. The driving circuit 80 receives the driving signals from the line-frequency switch 50 and accordingly drives the isolation voltage-quadrupling DC converter 11 and the AC selecting switch unit 12 of the inverter 10.

The inverter 10 is electrically connected to the solar cell module 20. Under control, the inverter 10 converts the DC power supply to a half-sine current in a continuous conduction mode. Then, the AC selecting switch and the grid are switched synchronously to convert the half-sine current to a sine current at the same voltage as the grid 30. Thus, a unit power factor is fed to the grid 30 to overcome the drawbacks of the prior art and increase the efficiency of the conversion of sun light to electricity.

Figure 3:
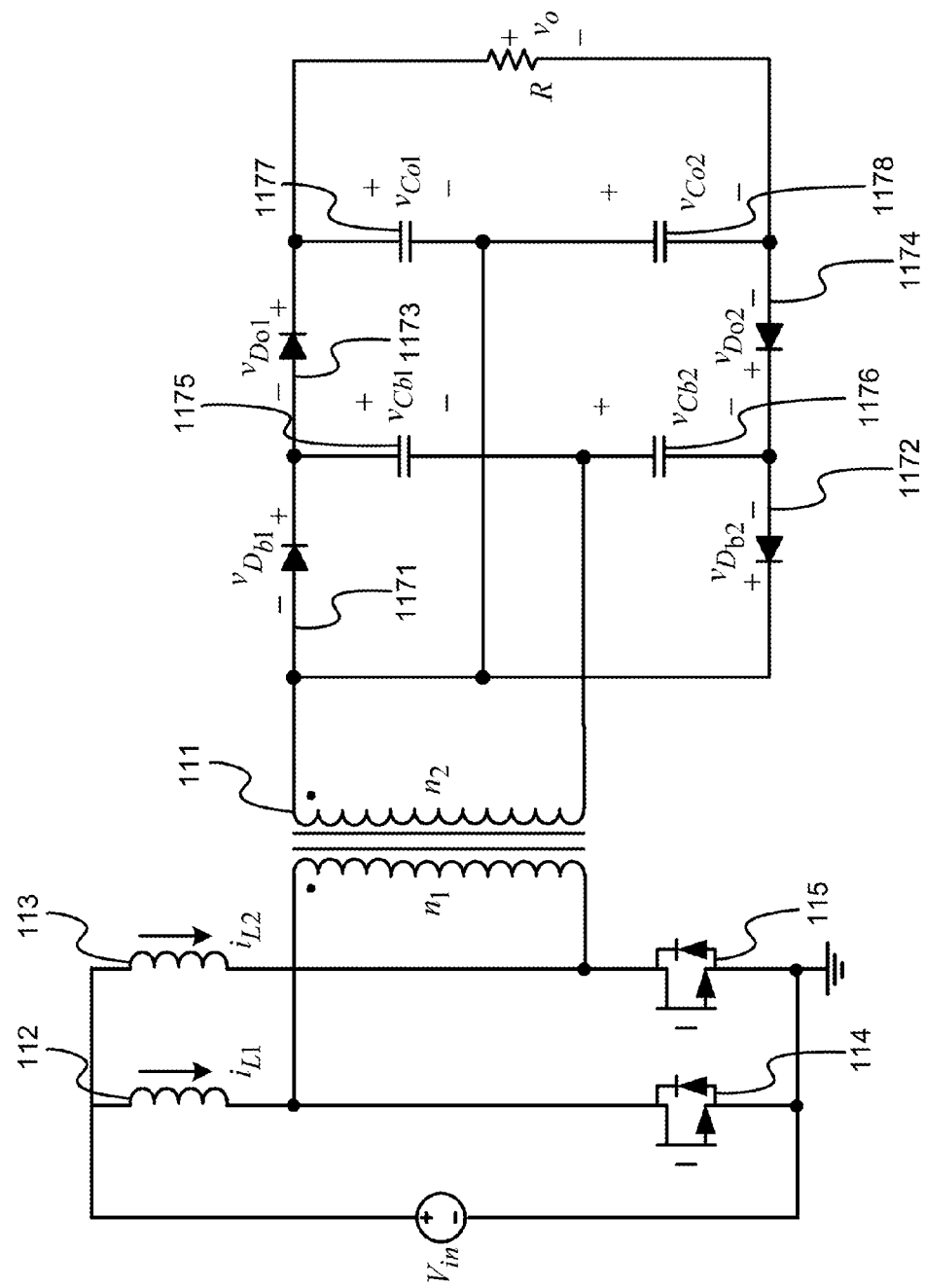
FIG. 3 is a circuit diagram of an isolation voltage-quadrupling DC converter used in the soft-switching inverter shown in FIG. 2.

Referring to FIG. 3, the isolation voltage-quadrupling DC converter 11 is the primary booster in the soft-switching inverter 10. The operation of the isolation voltage-quadrupling DC converter 11 will be described referring to FIGS. 4 through 9.

Figure 4:
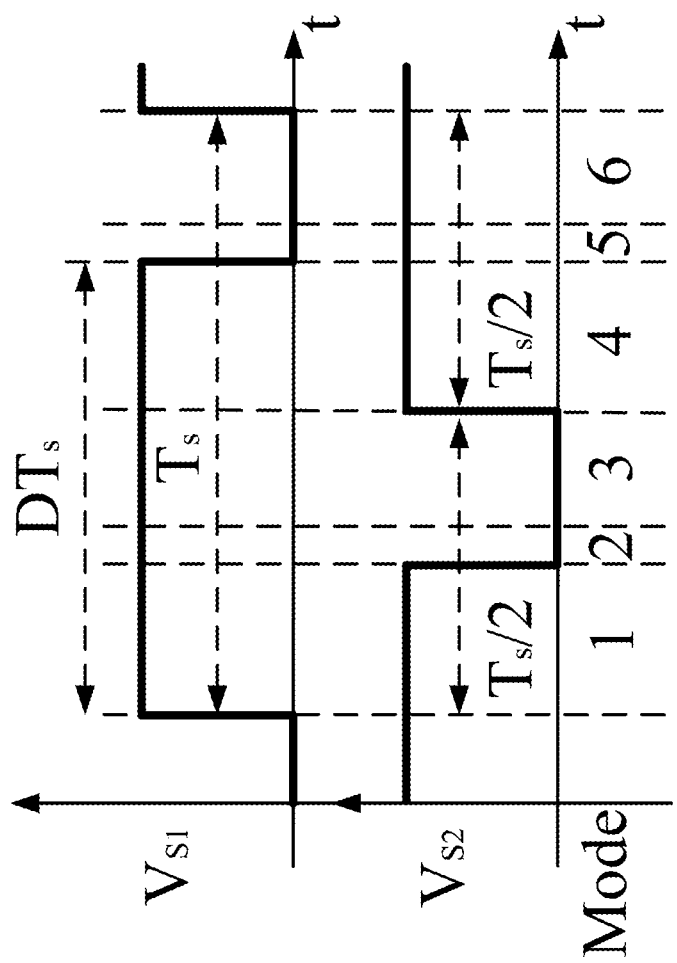
FIG. 4 is a chart of operative ranges of the isolation voltage-quadrupling DC converter shown in FIG. 3.

Referring to FIG. 4, the first main switch 114 and the second main switch 115 are switched alternately. The difference between their phases is 180 degrees. As shown, there are 6 operative regions.

Figure 5:
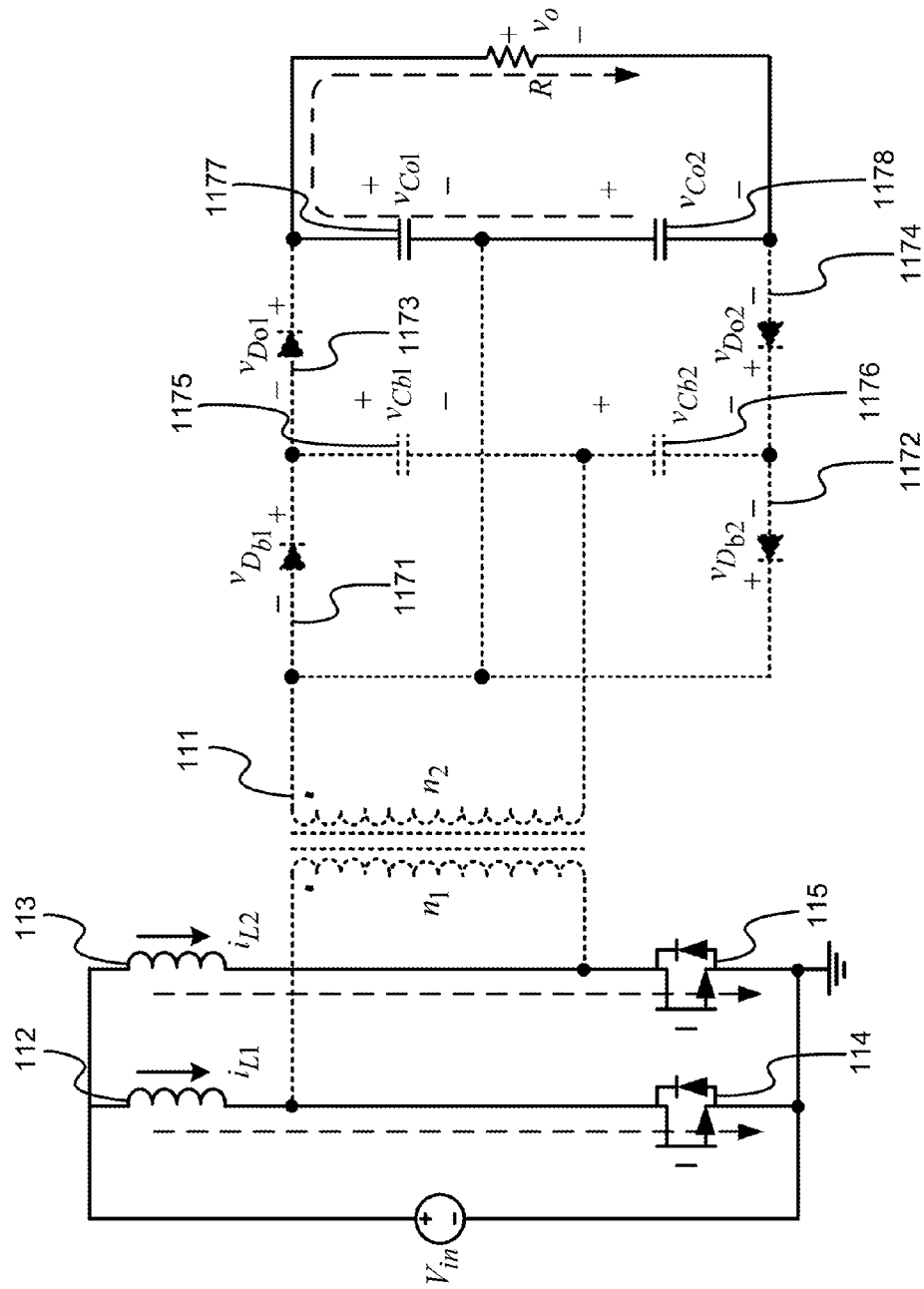
FIG. 5 is a circuit diagram of the isolation voltage-quadrupling DC converter shown in FIG. 3 in modes 1 and 4.

Referring to FIG. 5, shown is an equivalent circuit of the isolation voltage-quadrupling DC converter 11 in operative mode 1. The first main switch 114 and the second main switch 115 are on. Their input ends recharge the first inductor 112 and second inductor 113. Two-phase inductance currents $i_{L1}$ and $i_{L2}$ increase linearly. The third capacitor 1177 and the fourth capacitor 1178 provide electricity to the load.

Figure 6:
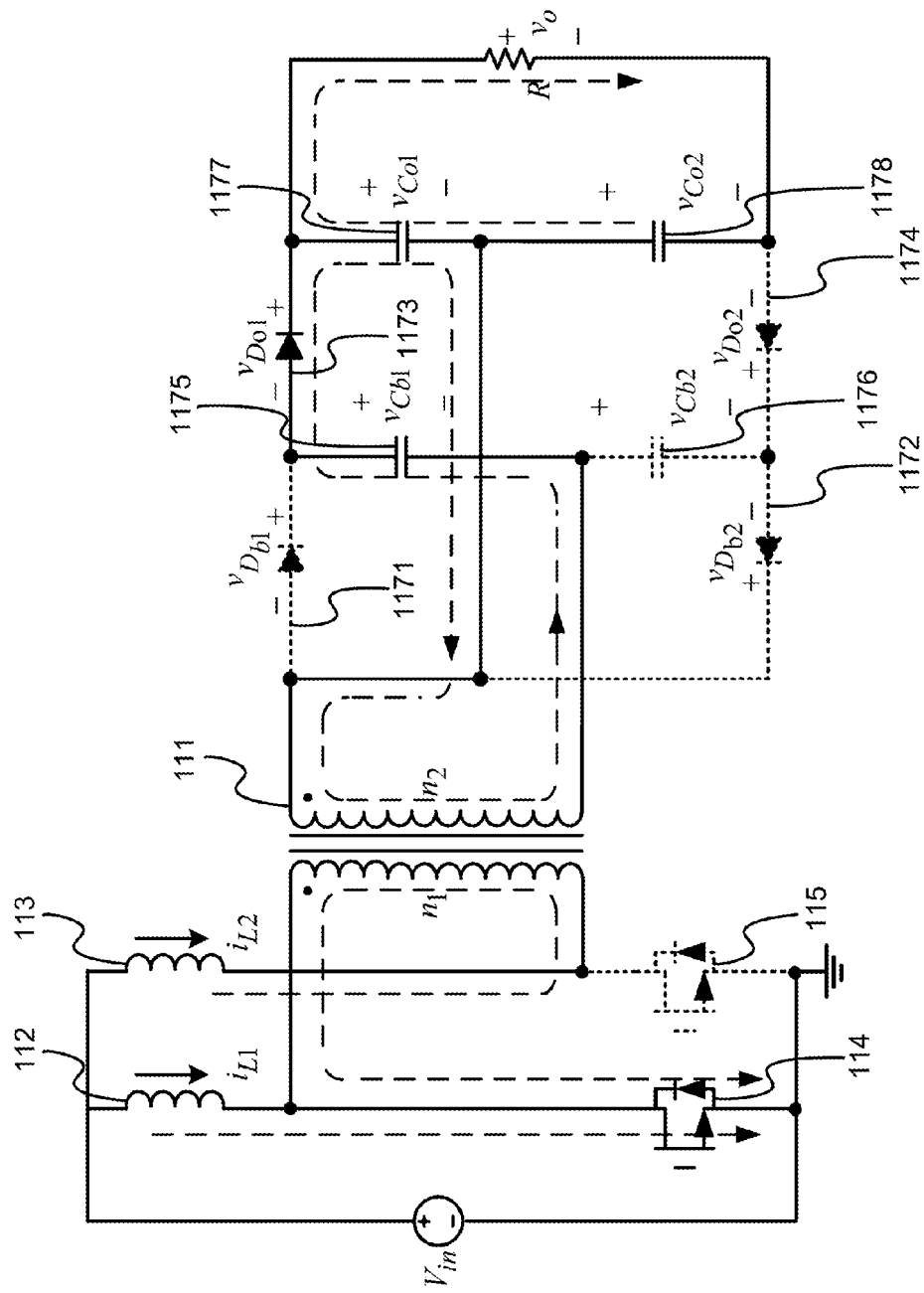
FIG. 6 is a circuit diagram of the isolation voltage-quadrupling DC converter shown in FIG. 3 in mode 2.

Referring to FIG. 6, shown is an equivalent circuit of the isolation voltage-quadrupling DC converter 11 in operative mode 2. The first main switch 114 is on. The second main switch 115 is off. The first inductor 112 continues to be recharged. The inductance current $i_{L2}$ continues to go to the high-voltage side via the isolation transformer 111. The first capacitor 1175 recharges the third capacitor 1177 to reach a voltage balance, i.e., $V_{Cb1} + V_{Cb2} = V_{Co1}$. The capacitor third capacitor 1177 and the fourth capacitor 1178 provide electricity to the load.

Figure 7:
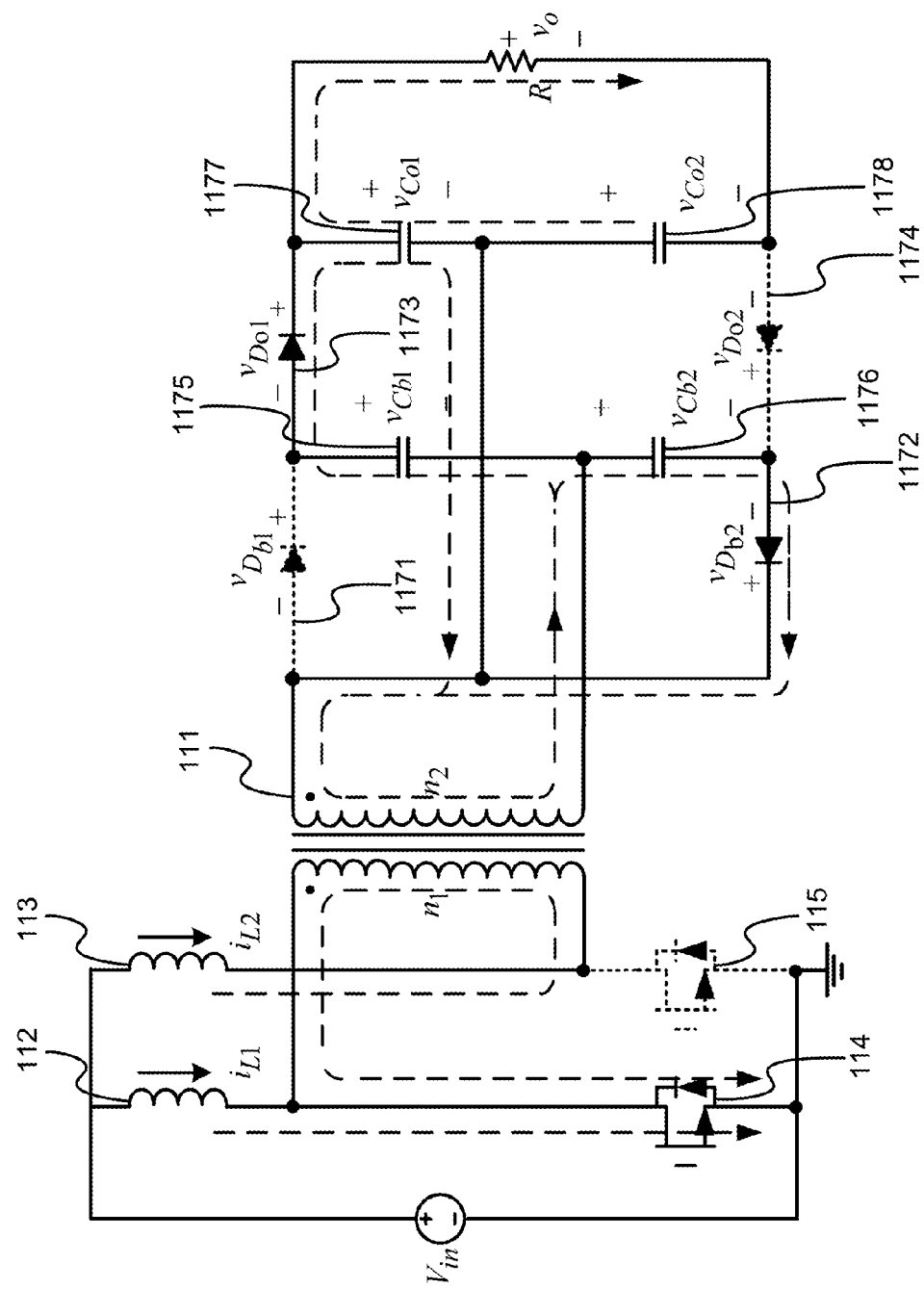
FIG. 7 is a circuit diagram of the isolation voltage-quadrupling DC converter shown in FIG. 3 in mode 3.

Referring to FIG. 7, shown is an equivalent circuit of the isolation voltage-quadrupling DC converter in mode 3. The first main switch 114 is on. The second main switch 115 is off. The first inductor 112 continues to be recharged. The inductance current $i_{L2}$ continues to go to the high-voltage side to recharge the second capacitor 1176 and, together with the first capacitor 1175, recharge the third capacitor 1177. The first capacitor 1175 and the second capacitor 1176 provide electricity to the load.

In mode 4, the equivalent circuit of the isolation voltage-quadrupling DC converter 11 is like that is shown in FIG. 5.

Figure 8:
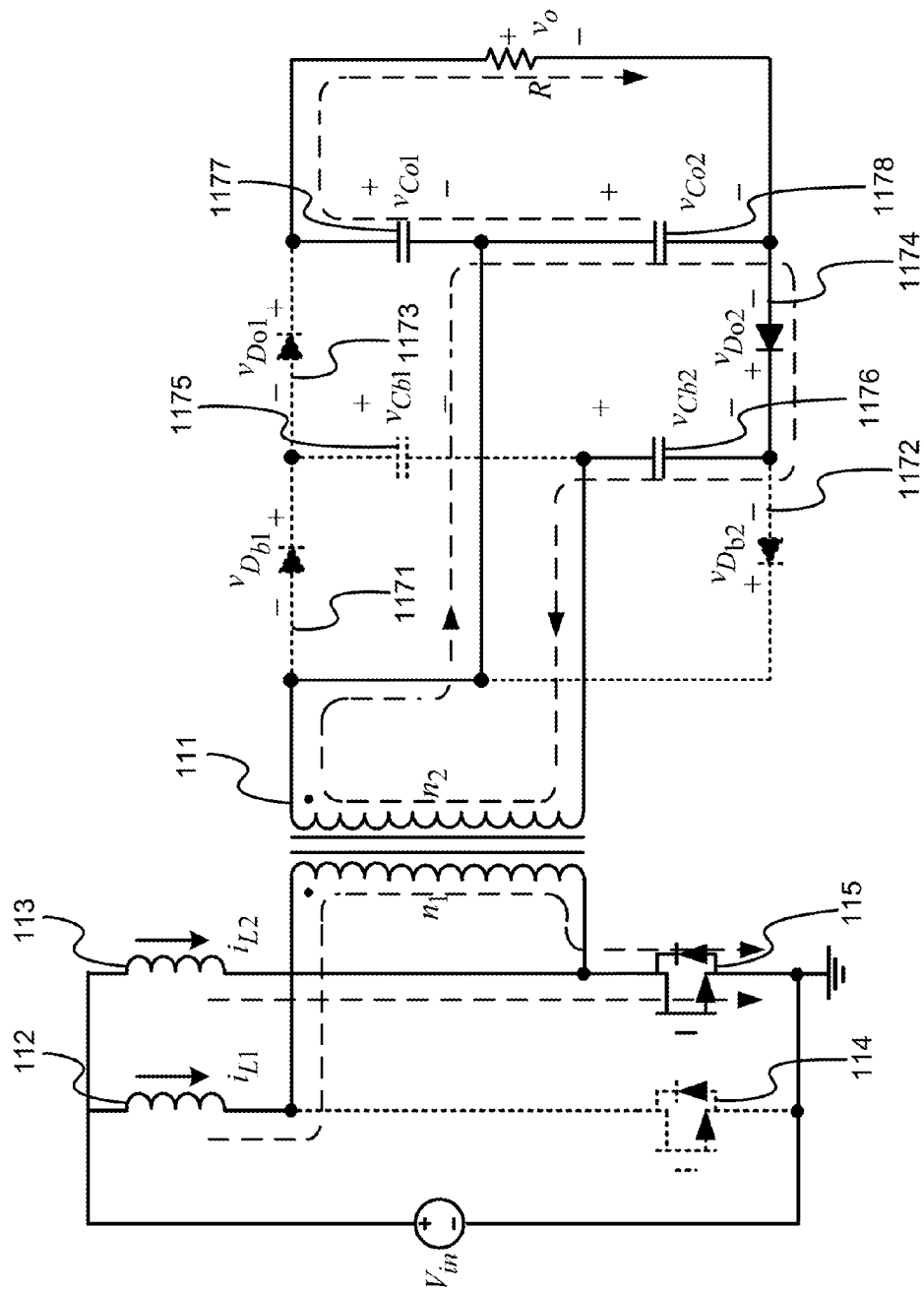
FIG. 8 is a circuit diagram of the isolation voltage-quadrupling DC converter shown in FIG. 3 in mode 5.

Referring to FIG. 8, show is an equivalent circuit of the isolation voltage-quadrupling DC converter 11 in mode 5. The first main switch 114 is off. The second main switch 115 is on. The second inductor 113 continues to be recharged. The inductance current $i_{L1}$ continues to go the high-voltage side via the isolation transformer and, together with the second capacitor 1176, recharge the fourth capacitor 1178 to reach a voltage balance, i.e., $V_{Cb1}+V_{Cb2}=V_{Co2}$. The third capacitor 1177 and the fourth capacitor 1178 provide electricity to the load.

Figure 9:
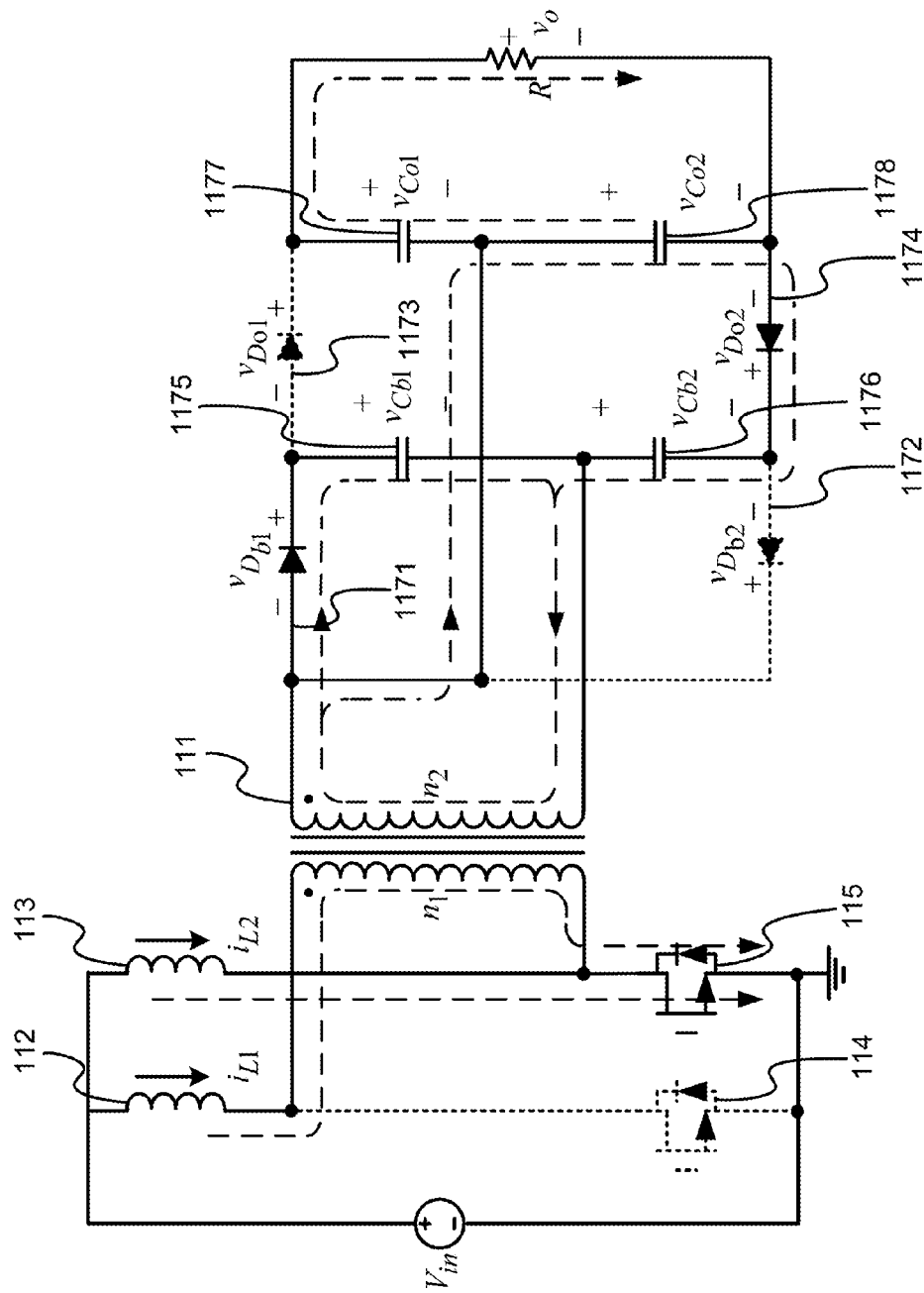
FIG. 9 is a circuit diagram of the isolation voltage-quadrupling DC converter shown in FIG. 3 in mode 6.

Referring to FIG. 9, shown is an equivalent circuit of the isolation voltage-quadrupling DC converter 11 in mode 6. The first main switch 114 is off. The second main switch 115 is on. The second inductor 113 continues to be recharged. The inductance current $i_{L1}$ continues to go the high-voltage side to recharge the first capacitor 1175 and, together with the second capacitor 1176, recharge the fourth capacitor 1178. The third capacitor 1177 and the fourth capacitor 1178 provide electricity to the load. By inference with a mathematical model and simulation for verification, the step-up ratio is calculated as follows:

$$\frac{V_o}{V_{IN}} = \frac{4n}{1-D}$$

wherein n is the turn ratio of the isolation transformer 111. The isolation voltage-quadrupling DC converter 11 helps boost the output voltage of the solar cell module to the level of the grid to facilitate the provide of the electricity to the grid.

Figure 10:
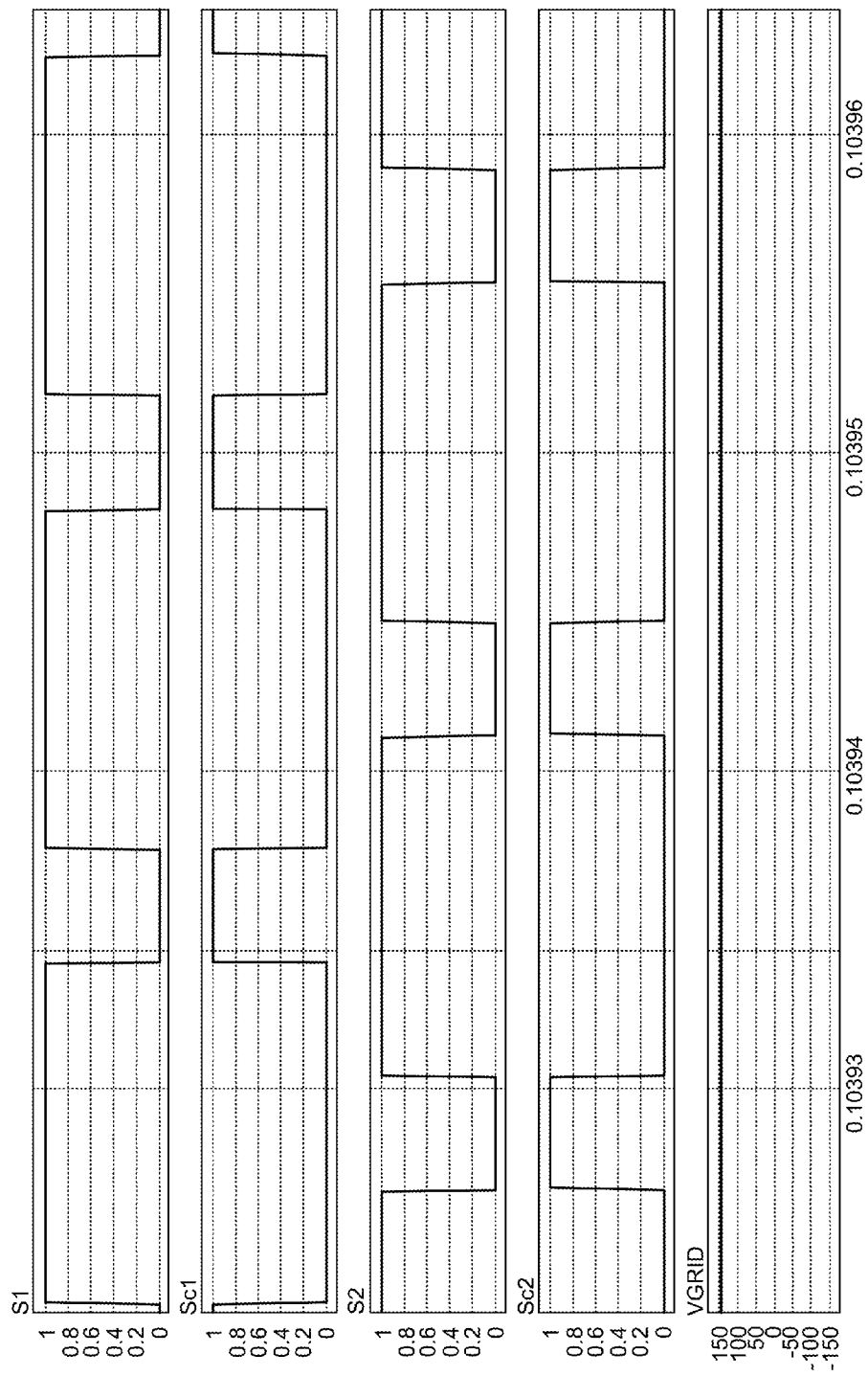
FIG. 10 shows driving signals from main switches and clamping switches of the soft-switching inverter shown in FIG. 2 at a maximum value.

Referring to FIG. 10, there are shown switch signals on the primary side of the circuit, i.e., the driving signals when the main switches and the claiming switch are at the maximum voltage of the grid. As shown, the active clamping switch $S_{c2}$ and the main switch $S_2$ are switched in a complementary manner, the active clamping switch $S_{c1}$ and the main switch $S_1$ are switched in a complementary manner, and the difference between the phases of the main switch $S_1$ and the main switch $S_2$ is 180 degrees. When the main switch and the active clamping switch are switched, there is a dead time for soft switching.

Figure 11:
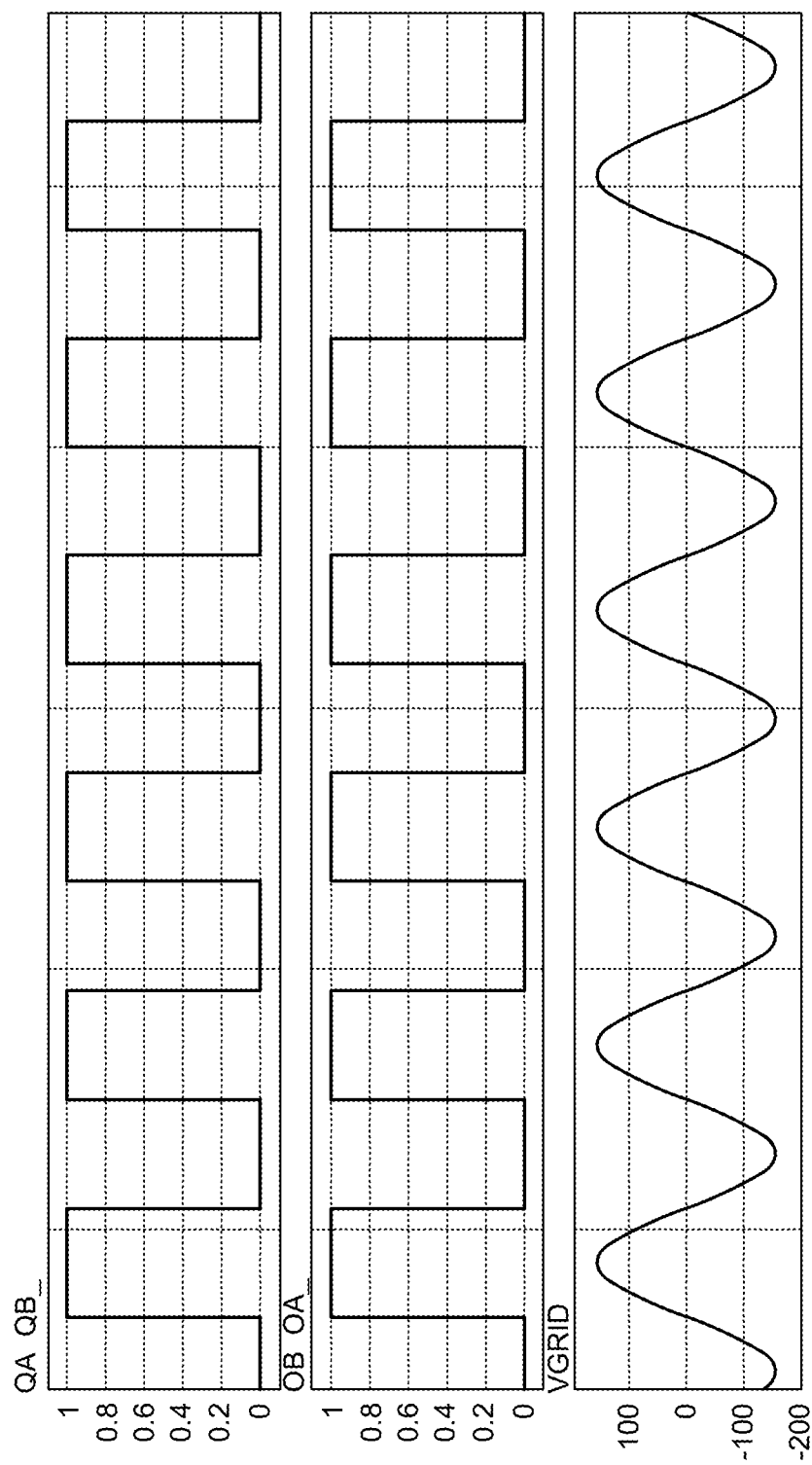
FIG. 11 shows driving signals from a line-frequency select switch on an AC side of the isolation voltage-quadrupling DC converter shown in FIG. 3.

Referring to FIG. 11, there are shown driving signals from a line-frequency select switch on an AC side of the isolation voltage-quadrupling DC converter 11. In addition, the switching signals of the AC selecting switch are shown. The frequency of the switching of the AC selecting switch is identical to that of the grid, and their phases are identical. In the AC selecting switch, there is only low-frequency switching synchronous with the grid. The AC selecting switch does not control the current. Therefore, there is a need for the inverter to produce a half-sine current that will later be converted to a sine current that is fed to the grid. To produce the half-sine current and boost the voltage for the grid, inductors $L_1$ and $L_2$ are connected to each other in parallel to achieve conversion. On the low-voltage side, four switches are switched to execute the half-sine modulation for a continuous on mode. After the isolation transformer connects the low-voltage current to the high-voltage side, the booster on the high-voltage side boosts the voltage of the solar cell module to the level of the grid so that the current can be fed to the grid.

Figure 12:
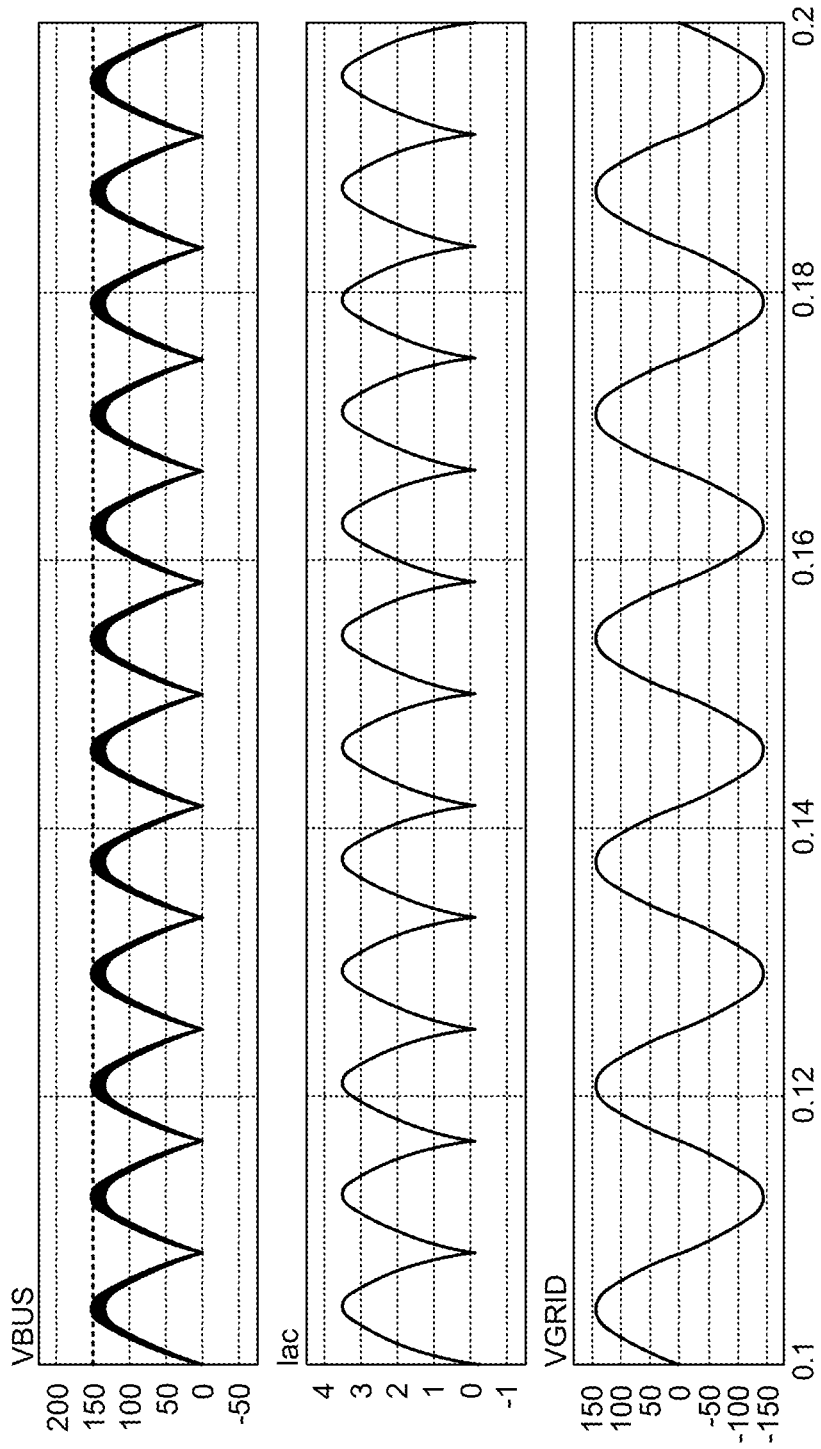
FIG. 12 shows waveforms on a high-voltage side of the isolation voltage-quadrupling DC converter shown in FIG. 3.
Figure 13:
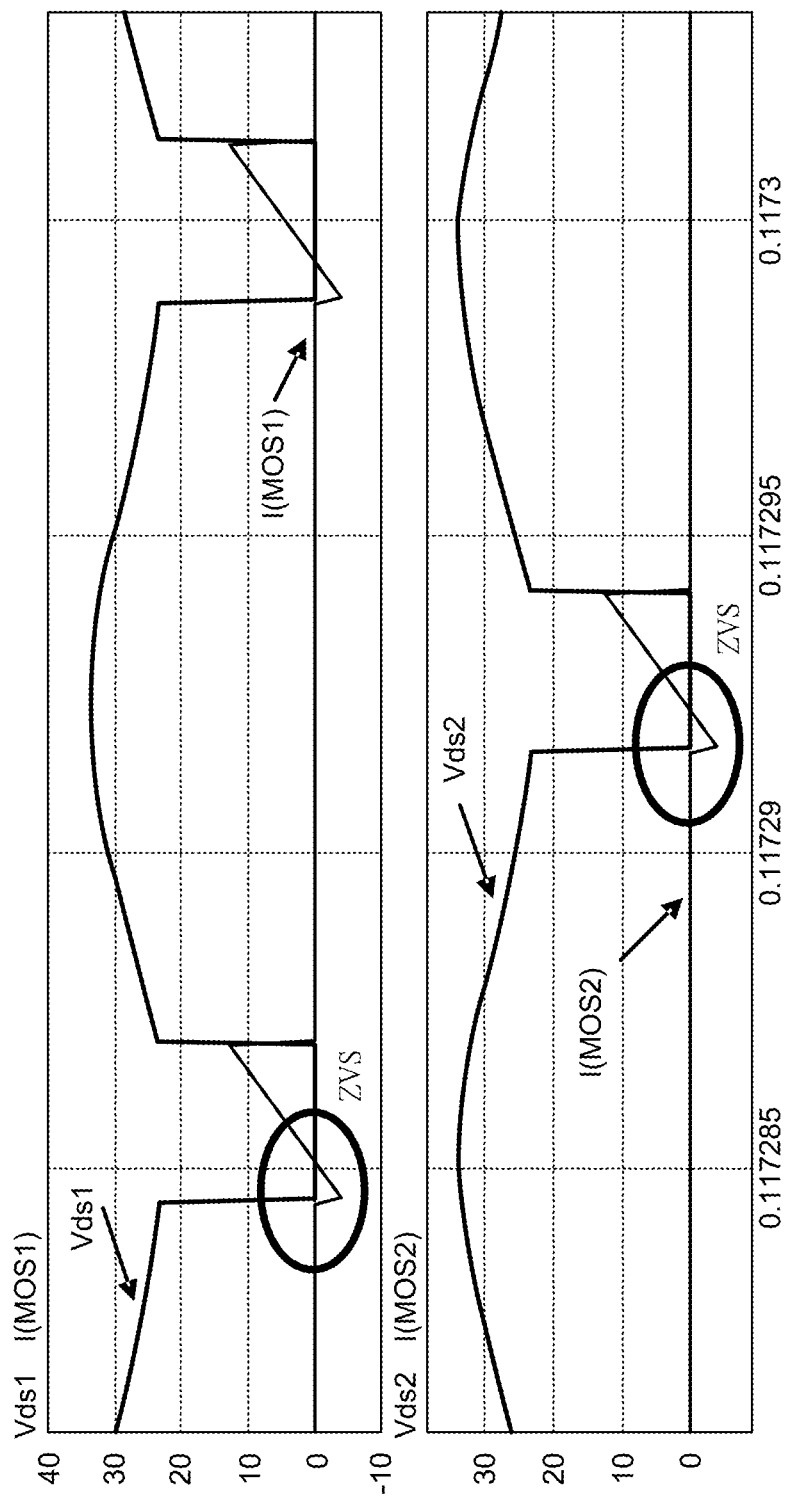
FIG. 13 shows soft-switching waveforms of the main switches on a low-voltage side of the isolation voltage-quadrupling DC converter shown in FIG. 3.
Figure 14:
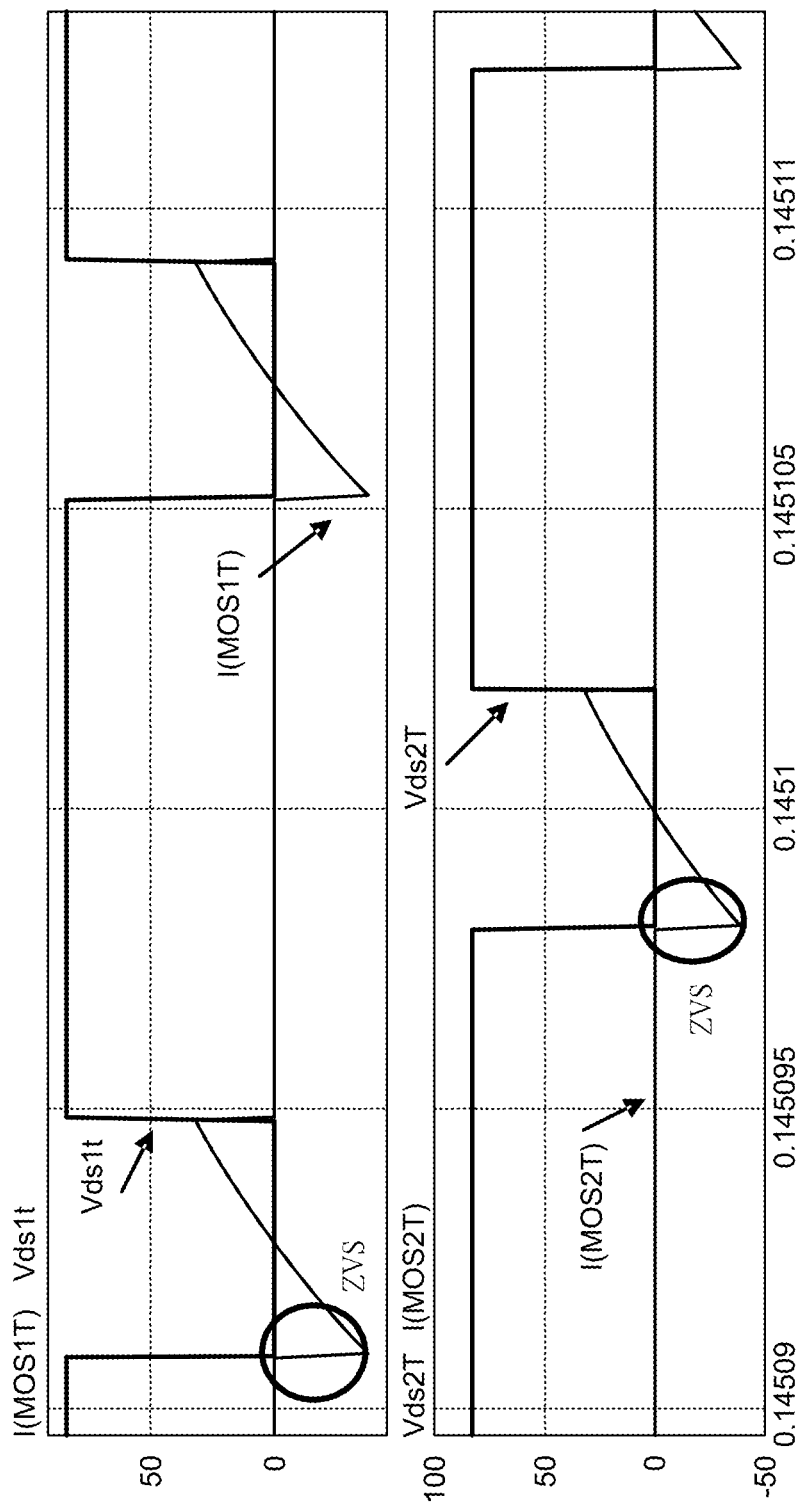
FIG. 14 shows soft-switching waveforms of the clamping switches on the low-voltage side of the isolation voltage-quadrupling DC converter shown in FIG. 2.

Referring to FIGS. 12 through 14, the inverter produces a continuous half-sine current. The rear end of the inverter switches with the grid synchronously via the AC selecting switches QA, QA', QB and QB' to convert the half-sine current to the sine-current at the same voltage as the grid so that the unit power factor can be fed to the grid.

As discussed above, the soft-switching high-efficiency inverter 10 exhibits several advantages.

At first, the low-voltage side is isolated from the high-voltage side.

Secondly, the conversion efficiency is high. The switches on the low-voltage side are used together with the active clamping switches to achieve the zero-voltage soft switching. The low-frequency operation of the phase-changing switches on the AC side also helps increase the conversion efficiency.

Thirdly, the operative range is not limited because the active clamping switches are used. The step-up ratio is high to facilitate the step-up of the voltage of the solar cell module to the voltage of the grid so that the electricity can be fed to the grid. The inverter 10 is therefore suitable for use in a low-power photovoltaic system module with large voltage variation.

Fourthly, it is reliable. The life of an inverter is limited by the life of a capacitor used therein and the temperature. Referring to FIG. 2, the inverter 10 does not include any electrolysis capacitor. On both the high-voltage and low-voltage sides, small-capacity thin-film capacitors are used to screen high frequency of switching or transfer of energy to help boost the voltage, not store energy.

Fifthly, the leakage inductance and switch stress are low. The inverter 10 exhibits a high step-up ratio by nature without having to include a high turn ratio of the isolation transformer.

Sixthly, it is durable for including the switches for soft switching.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A soft-switching inverter including:
    an isolation voltage-quadrupling DC converter including an isolation transformer, wherein the isolation transformer includes a first inductor, a second inductor, a first main switch, a second main switch and an active clamping circuit on a low-voltage side, wherein the active clamping circuit includes a first clamping switch, a second clamping switch and a clamping capacitor, wherein the isolation transformer includes a first diode, a second diode, a third diode, a fourth diode and a booster on a high-voltage side, wherein the booster includes a first capacitor, a second capacitor, a third capacitor and a fourth capacitor, wherein the isolation voltage-quadrupling DC converter receives a DC power supply, converts the voltage of the DC power supply, and executes half-sine modulation on the DC power supply for operation in a continuous conduction mode, thus a continuous half-sine current; and
    an AC selecting switch unit electrically connected to the isolation voltage-quadrupling DC converter and the grid, wherein the AC selecting switch unit includes a first power switch, a second power switch, a third power switch and a fourth power switch, wherein the switches are switched in synchronization with the grid to convert the half-sine current to a sine current, wherein a low-frequency portion is filtered from the sine current with a filtering inductor and a filtering capacitor to render the output current a sine current at the same voltage as the grid so that electricity can be fed to the load or a unit power factor can be fed to the grid.

2. The soft-switching inverter according to claim 1, wherein the first main switch, the second clamping switch and the second main switch are switched in a complementary manner, wherein the second main switch, the first clamping switch and the first main switch are switched in a complementary manner.

3. The soft-switching inverter according to claim 1, wherein the difference between the phases of the first and second main switches is 180 degrees.

4. The soft-switching inverter according to claim 1, wherein the first clamping switch and the first main switch are switched, wherein the second clamping switch and the second main switch are switched to provide a dead time for soft switching.

5. The soft-switching inverter according to claim 1, wherein the step-up ratio is $$\frac{V_o}{V_{IN}} = \frac{4n}{1-D},$$

wherein n stands for the turn ratio of the isolation transformer.

* * * * *